July 11, 1939.  S. LEVISON  2,165,557
TREATMENT OF FRUITS AND VEGETABLES
Filed Sept. 23, 1938
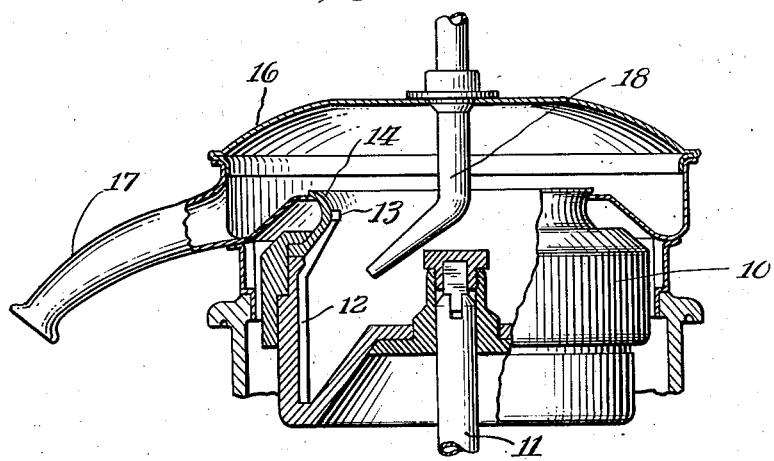
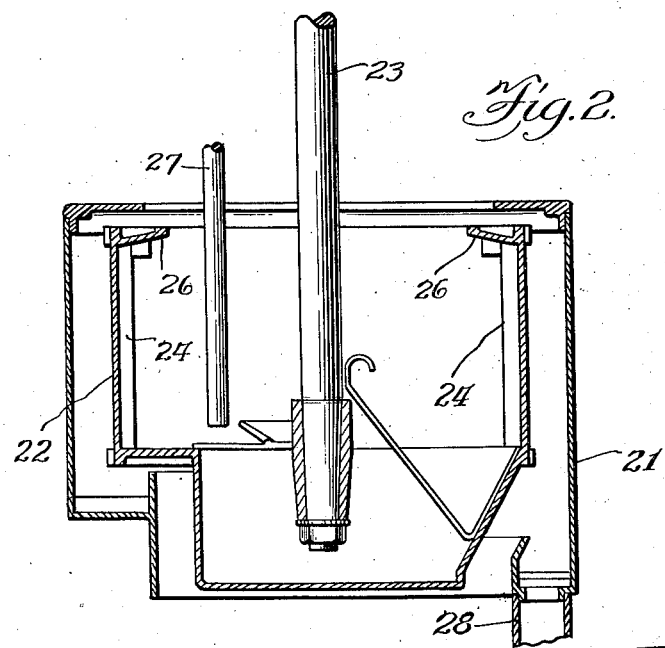
Inventor
Samuel Levison
By McLaughlin & Hallenstein
Attorneys Patented July 11, 1939

2,165,557

UNITED STATES PATENT OFFICE 2,165,557

TREATMENT OF FRUITS AND VEGETABLES

Samuel Levison, Chicago, Ill.

Application September 23, 1938, Serial No. 231,402

9 Claims. (Cl. 146—219)

My invention relates to the treatment of fruits and vegetables and is particularly concerned with improved processes for removing dust, dirt, fibrous material, grit, sediments and undesired materials in general from the fruits or vegetables while recovering a substantial maximum of the desired fruit or vegetable solids and juices.

Many fruits and vegetables by their very nature and manner of growth to maturity become contaminated with dust, dirt, and the like in such a manner that the removal thereof is exceedingly difficult to accomplish. Thus, for example, in the case of berries of the bush variety, dust, dirt and grit, from the fields, are blown on or otherwise brought in contact with the berries and as the berries continue to grow this dust, dirt and grit become encased or embedded in the flesh of the berry. The removal of this extraneous and undesired material from the berry by a washing operation is not only substantially impossible because of the encasement thereof in the berry flesh but there are also serious objections to such washing operations. In the case of delicate berries, such as red raspberries and black raspberries, any substantial amount of washing with water is unfeasible since such washing results in the removal of considerable amounts of color and juice from the berries in addition to bringing about material losses of desired fruit constituents. Furthermore, washing will not remove certain hard particles which are present in many fruits and vegetables and the removal of which is highly desirable if a fully satisfactory product is to be produced.

I have evolved a novel process, hereinafter described in detail, whereby the removal of dust, dirt, grit, sediments, fibrous materials, hard particles and, in general, undesirable constituents and materials from fruits and vegetables may be effected in a simple and efficacious manner without loss of the desired fruit or vegetable solids and juices.

In general, my process makes use of the principle of centrifugal action. I am aware that it has already been proposed to utilize centrifugal means to separate fruit oils from fruit juices, to separate seeds and skins from tomato pulp, and to separate sludge particles and the like from fruit juices. None of these known procedures has any relation to my novel process.

If fruit pulp is passed through a centrifugal bowl or basket separator, such as the ordinary cream separator or the like, the effluent from the bowl or basket consists primarily of fruit juices or liquids, and a wall or layer of desirable fruit solids containing occluded dirt, sand, and the like builds up rapidly on the interior surface of the bowl or basket. The machine must be stopped frequently for cleaning these accumulations in the bowl or basket. Moreover, the products produced are not those desired for preserving or similar purposes since the fruit juices are separated from the fruit solids and, furthermore, the fruit solids remain contaminated with the dust, dirt and the like.

I have discovered that if a fruit or vegetable pulp, preferably preliminarily treated as hereinafter described, is subjected to centrifugal action in a bowl or basket or the like provided with dirt, sand or grit-restraining means such as vanes, ribs or baffle means, surprisingly enough the dirt, sand, grit and other undesirable constituents separate out from the desirable fruit or vegetable solids and juices and build up a layer on the interior wall or surfaces of the bowl or basket, and the effluent from the bowl or basket contains both the desirable fruit or vegetable solids and the juices. Furthermore, instead of frequent stoppage of operations being required for removing accumulations from the centrifugal bowl or basket, the practice of my invention permits relatively continuous operation. As illustrative of my invention, I have been able to feed fruit pulp continuously into a relatively small centrifuge of the character indicated for a period of eight hours with only several interruptions for cleansing of the bowl or basket. On the other hand, and by way of sharp contrast, the employment of the conventional centrifugal apparatus for treating fruit pulp requires interruption and cleansing every few minutes, independently of the fact that the desired separation of constituents is not effected.

In order that those skilled in the art may even more fully understand the novel features of my invention and the manner in which the same may be carried out, I shall describe hereinbelow an illustrative example of my process in conjunction with the accompanying drawing wherein:

Figure 1 is a vertical section view of a centrifugal machine which may be employed in the practice of my invention.

Figure 2 is a different type of centrifugal machine which may be used in carrying out my invention.

In Figure 1, a conventional type of centrifugal bowl separator is shown, modified, however, to render it suitable for use in accordance with my invention. In this figure, a bowl 10 is mounted upon a vertical shaft 11, adapted to be rotated at a rapid rate of speed by means not shown. Fixedly attached to the inner surface or wall of the bowl, in any desired manner, is a plurality of vanes, ribs or baffles 12, vertically arranged. In the preferred embodiment, these vanes or the like are four in number and are spaced equidistantly, in other words being 90 degrees apart from each other. It will be appreciated that these vanes may be differently arranged and there may be more or less than four of them. They serve to catch the dirt, sediment and other foreign matter which is to be separated from the desired fruit and vegetable values.

A circular collar 13 is provided which serves to hold back any dirt, sediment or other undesired foreign matter which might otherwise tend to wash upward with the finished effluent by reason of the increased hydrostatic pressure at this part of the bowl. A generally circular portion 14 is provided which, as shown, has an increased diameter in the direction of flow of the effluent, thereby speeding up the effluent flow which discharges into the receiving cover 16 from which it passes out through the spout 17 into any suitable receiver or receptacle. Mounted through the cover 16 is an inlet spout or feed tube 18 through which the fruit or vegetable pulp to be treated is fed into centrifugal bowl 10.

The device shown in Figure 2 is a suspended basket type of centrifuge which may also be used with efficacy in the practice of my invention. This comprises an outer stationary casing 21 within which a basket 22 is mounted for rotation on the vertical shaft 23. As described in connection with the embodiment of Figure 1, the basket is provided with a plurality of vanes or ribs 24, in this case again four in number, spaced 90 degrees apart. The upper edge of the basket is provided around its entire periphery with an inwardly extending lip member 26 which serves to hold back any dirt, sediment or other undesired foreign matter, serving the same general purpose as the collar 13 of Figure 1. An inlet spout or feed tube 27 serves to introduce the fruit or vegetable pulp to be treated into the basket, and a discharge pipe or conduit 28 serves to carry away the effluent containing the desired fruit or vegetable solids and juices which is discharged over the lip 26 in a continuous stream during the operation of the apparatus.

Considering the treatment of red or black raspberries in accordance with my invention by way of example, the berries are preferably covered with just sufficient water to parboil the fruit. In certain cases, depending upon the nature or condition of the fruit, the addition of water may be eliminated. The water aids in softening the berries and in breaking down their structure so as to permit the substantially complete removal of dirt, sand and other foreign matter, as hereinafter described. The berries are then allowed to boil for a period of time, generally from three to five minutes in the average case, to further soften the same to the extent desired. The degree of softening and the extent of the cooking are variable, depending upon the character of the fruit, its consistency, ripeness, and the like. The berries, including the water in which they have been cooked, are then passed through a "finisher" or "pulper" which serves to separate coarse seeds and certain other insoluble matter from the desired fruit solids and juices. The conventional "finisher" or "pulper" comprises a perforated cylinder into which the fruit mixture is passed, the desired fruit solids and juices being forced through the perforations with the aid of an arm, brush or paddle which is mounted in the cylinder and moves, relatively to the cylinder, in close contact with the inner wall thereof. In this manner, the coarse seeds and certain other undesired foreign particles remain in the cylinder from which they are then ejected, and the desired fruit solids and juices pass away therefrom and are recovered in the form of a pulp. This pulp, however, still contains small particles of sand, dirt and other undesirable foreign matter which were not removed in the "finisher" or "pulper" and which must be eliminated if a product of outstanding quality is to be obtained.

The berry pulp, obtained as described hereinabove, is then fed into the centrifuge described in either of Figure 1 or 2. Utilizing the apparatus of Figure 1 with a bowl having an internal diameter of six and one-half inches and a depth of four and one-half inches and rotating at approximately 7000 R. P. M., a feed of about 900 to 1000 pounds per hour has been found to be eminently satisfactory. The effluent which is discharged into the outlet spout in a continuous stream contains essentially all of the desired and beneficial berry solids and juices and only the foreign and other objectionable matter are removed, collecting as a layer gradually increasing in thickness on the interior surface of the centrifugal bowl. The operation of the centrifugal machine is substantially continuous, it being necessary to interrupt operations not more than once for every 900 or 1000 pounds of fruit pulp treated to clean the bowl of the accumulated dust, dirt, sand and other foreign matter. In a representative run on red or black raspberries, in accordance with my process, for a total of 1000 pounds of fruit solids and juices recovered, the amount of fibre, dirt, dust and grit and the like which collected on the walls of the bowl amounted to approximately seven ounces.

Surprisingly enough, as previously pointed out, the operation of the centrifugal mechanism in accordance with my invention does not remove all of the ingredients which are heavier than the effluent but permits the discharge of the desirable fruit or vegetable solids together with the lighter liquid effluent, the objectionable foreign matter remaining behind in the bowl or basket.

The practice of my invention also brings about important advantages additional to those previously mentioned and others readily apparent to those versed in the art. In particular, the particle size of the fruits or vegetables is greatly decreased with the result that the fruit or vegetable has a finer texture and is more palatable and more easily digested, this being particularly important in the case where the product is prepared for consumption by infants.

The fruit or vegetable pulp as it issues from the discharge conduit of the centrifugal machine may be utilized in the preparation of seedless preserves and jams or it may be canned or treated in any desired manner. Thus, for example, it may be cooked down in either an open kettle or under vacuum, with or without sugar, and may be canned or utilized in the preparation of fruit pies, seedless preserves and jams, purees, and for the various purposes to which fruits or vegetables may be placed.

It is evident that my process is adapted for the treatment of fruits and vegetables in general to effect the removal therefrom of dust, dirt, sand and other objectionable foreign matter while permitting a substantially maximum recovery of the desirable fruit or vegetable solids and juices. Among the fruits and vegetables which may be treated are, for example, apples, pears, carrots, spinach, asparagus, strawberries, blackberries, raspberries, grapes, youngberries, boysenberries, loganberries, dewberries, tomatoes, and the like.

It will also be appreciated that my novel process is not limited to the use of any specific apparatus nor to any particular conditions of operation of my apparatus. I have illustrated two types of centrifugal machines which may with advantage be employed in the practice of my invention. The centrifugal machines may be of variable size and capacity as, for example, up to 48 inches or more in diameter of the bowl or basket with a through-put of from 50 gallons to 4000 gallons, or more or less, hourly of fruit or vegetable pulp. Furthermore, it will be evident that the speed of rotation of the centrifugal bowl or basket may be varied within relatively wide limits without departing from the spirit of my invention. Those skilled in the art will, in the light of my teachings herein, readily be able to make such modifications or adaptations as the exigencies of any particular case may dictate, all within the scope of my invention as pointed out in the appended claims.

What I claim as new and desire to protect by Letters Patent of the United States is:

1. In a process for treating fruits of the character of raspberries, blackberries, and the like, the steps which include preliminary preparation of a pulp of said fruit and from which at least a substantial part of such coarse seeds and undesired insoluble materials which may have been present have been removed, and then subjecting said fruit pulp to centrifugal action in a bowl provided on its inner walls with generally vertically arranged vanes or ribs whereby dust, dirt, and other undesired constituents collect along the inner walls of said bowl and the desired fruit solids and juices are discharged from the bowl as the effluent.

2. The process of preparing fruits or vegetables for preserving, canning, and the like, which comprises preliminarily breaking down the fruit or vegetable structure, removing at least a substantial part of such coarse seeds and other undesired insoluble matter as may be present, and then subjecting the remaining fruit or vegetable product to centrifugal action in a bowl provided on its inner walls with generally vertically arranged vanes or ribs whereby dust, dirt and other undesired constituents collect along the inner walls of said bowl and the desired fruit or vegetable solids and juices are discharged from the bowl as the effluent.

3. The process of treating fruits or vegetables which comprises subjecting the fruits or vegetables to a preliminary heating operation to soften the same and break down the structure thereof, passing the resulting product through a "finisher", "pulper", or the like to remove at least a substantial part of such coarse seeds and other undesired insoluble matter as may be present, and then subjecting the remaining fruit or vegetable product to centrifugal action in a bowl provided on its inner walls with generally vertically arranged vanes or ribs whereby dust, dirt and other undesired constituents collect along the inner walls of said bowl and the desired fruit or vegetable solids and juices are discharged from the bowl as the effluent.

4. The process of treating fruit of the character of raspberries, blackberries, and the like which comprises parboiling the fruit to soften the same, removing at least a substantial part of such coarse seeds and other undesired insoluble matter as may be present, and then subjecting the remaining fruit product to centrifugal action in a bowl provided on its inner walls with generally vertically arranged vanes or ribs whereby dust, dirt and other undesired constituents collect along the inner walls of said bowl and the desired fruit solids and juices are discharged from the bowl as the effluent.

5. The process of treating fruit of the character of raspberries, blackberries, and the like which comprises parboiling the fruit to soften the same, passing the resulting product through a "finisher", "pulper" or the like to remove coarse seeds and other insoluble matter present therein, and then continuously feeding the remaining fruit pulp to the bowl of a centrifugal machine whereby the pulp is subjected to centrifugal action, the bowl being provided on its inner walls with spaced, generally vertically arranged vanes or ribs whereby dust, dirt and other undesired constituents collect along the inner walls of said bowl and the desired fruit solids and fruit juices are continuously discharged from the bowl as the effluent, the arrangement being such that the continuity of the process may be maintained for relatively long periods of time without the necessity for discontinuing operation to clean the bowl.

6. The process of preparing fruits or vegetables for preserving, canning, and the like, which comprises preliminarily breaking down the fruit or vegetable structure, removing at least a part of such coarse seeds and other undesired insoluble matter as may be present, and then subjecting the remaining fruit or vegetable product to centrifugal action in a bowl provided with a peripheral collar and, on its inner walls, with generally vertically arranged vanes or ribs whereby dust, dirt and other undesired constituents collect along the inner walls of said bowl and the desired fruit or vegetable solids and juices are discharged from the bowl as the effluent.

7. The process of treating fruits or vegetables which comprises subjecting the fruits or vegetables to a preliminary heating operation to soften the same and break down the structure thereof, passing the resulting product through a "finisher", "pulper", or the like to remove at least a substantial part of such coarse seeds and other undesired insoluble matter as may be present, and then subjecting the remaining fruit or vegetable product to centrifugal action in a bowl provided with a peripheral collar and, on its inner walls, with generally vertically arranged vanes or ribs whereby dust, dirt and other undesired constituents collect along the inner walls of said bowl and the desired fruit or vegetable solids and juices are discharged from the bowl as the effluent.

8. The process of treating fruit of the character of raspberries, blackberries, and the like which comprises parboiling the fruit to soften the same, passing the resulting product through a "finisher", "pulper", or the like to remove coarse seeds and other insoluble matter present therein, and then continuously feeding the remaining fruit pulp to the bowl of a centrifugal machine whereby the pulp is subjected to centrifugal action, the bowl being provided with means to restrain the movement of dust, dirt and other undesired constituents whereby said dust, dirt and other undesired constituents are retained in said bowl and collect along the inner walls thereof, and the desired fruit solids and fruit juices are continuously discharged from the bowl as the effluent, the arrangement being such that the continuity of the process may be maintained for relatively long periods of time without the necessity for discontinuing operation to clean the bowl.

9. In a process for treating fruits and vegetables, the steps which include preliminary preparation of a pulp of said fruit or vegetables and from which at least a part of such coarse seeds and undesired insoluble materials which may have been present have been removed, and then subjecting said fruit pulp to centrifugal action in a bowl provided with means for restraining movement of dust, dirt, and other undesired constituents whereby the same are retained within the bowl and collect along the inner walls thereof, and the desired fruit solids and juices are continuously discharged from the bowl as the effluent.

SAMUEL LEVISON.